(12) United States Patent
Hosein et al.

(10) Patent No.: US 11,650,781 B2
(45) Date of Patent: *May 16, 2023

(54) METHODS AND SYSTEMS FOR DISPLAYING CONTENT ON MULTIPLE NETWORKED DEVICES WITH A SIMPLE COMMAND

(71) Applicant: eBay Inc., San Jose, CA (US)

(72) Inventors: Marc Peter Hosein, Saratoga, CA (US); Steve Yankovich, San Jose, CA (US)

(73) Assignee: eBay Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/585,966

(22) Filed: Jan. 27, 2022

(65) Prior Publication Data

US 2022/0147306 A1 May 12, 2022

Related U.S. Application Data

(63) Continuation of application No. 16/995,257, filed on Aug. 17, 2020, now Pat. No. 11,269,583, which is a
(Continued)

(51) Int. Cl.
*G09G 5/00* (2006.01)
*G06F 3/14* (2006.01)
(Continued)

(52) U.S. Cl.
CPC ............ *G06F 3/1454* (2013.01); *G06F 3/017* (2013.01); *G06F 3/04883* (2013.01);
(Continued)

(58) Field of Classification Search
CPC .... G06F 3/1454; G06F 3/017; G06F 3/04883; H04M 1/724; H04N 21/4126;
(Continued)

(56) References Cited

U.S. PATENT DOCUMENTS 7,962,629 B2   6/2011   Bigioi et al.
8,749,452 B2   6/2014   Hosein et al.
(Continued)

FOREIGN PATENT DOCUMENTS

EP           2071578        6/2009
KR       1020090125111     12/2009
(Continued)

OTHER PUBLICATIONS

10-2019-7014897, "Notice of Allowance received for Korean Patent Application No. 10-2019-7014897, dated Feb. 20, 2020", Feb. 20, 2020, 4 Pages.
(Continued)

*Primary Examiner* — Thuy N Pardo
(74) *Attorney, Agent, or Firm* — FIG. 1 Patents (57) ABSTRACT

A method for displaying content displayed on one or more first devices on a second device is provided. The method includes receiving a request to display content currently displayed on a first device on a second device, the request including a gesture made on a screen of the first device, and pairing the first device to the second device. The method further includes transmitting instructions to the second device to display the content currently displayed on the first device, and transmitting the content currently displayed on the first device to the second device for display thereon.

20 Claims, 9 Drawing Sheets

Related U.S. Application Data continuation of application No. 16/005,229, filed on Jun. 11, 2018, now Pat. No. 10,747,491, which is a continuation of application No. 15/152,859, filed on May 12, 2016, now Pat. No. 10,007,477, which is a continuation of application No. 14/279,145, filed on May 15, 2014, now Pat. No. 9,367,281, which is a continuation of application No. 13/340,308, filed on Dec. 29, 2011, now Pat. No. 8,749,452.

(60) Provisional application No. 61/429,097, filed on Dec. 31, 2010.

(51) Int. Cl.
| | |
|---|---|
| H04N 21/422 | (2011.01) |
| H04N 21/41 | (2011.01) |
| H04M 1/724 | (2021.01) |
| G06F 3/01 | (2006.01) |
| G06F 3/04883 | (2022.01) |
| H04N 21/436 | (2011.01) |

(52) U.S. Cl.
CPC ........ *H04M 1/724* (2021.01); *H04N 21/4126* (2013.01); *H04N 21/41265* (2020.08); *H04N 21/4222* (2013.01); *H04N 21/42209* (2013.01); *H04N 21/42224* (2013.01); *H04N 21/43615* (2013.01)

(58) Field of Classification Search
CPC ....... H04N 21/41265; H04N 21/42209; H04N 21/4222; H04N 21/42224; H04N 21/43615
USPC .............. 345/156, 173, 168, 169, 157, 174; 455/420, 566; 715/205, 728; 709/204; 348/14.07
See application file for complete search history.

(56) References Cited

U.S. PATENT DOCUMENTS

| | | | |
|---|---|---|---|
| 8,869,038 | B2 | 10/2014 | Eick |
| 9,367,281 | B2 | 6/2016 | Hosein et al. |
| 10,007,477 | B2 | 6/2018 | Hosein et al. |
| 10,747,491 | B2 | 8/2020 | Hosien et al. |
| 11,269,583 | B2 | 3/2022 | Hosein et al. |
| 2003/0004984 | A1* | 1/2003 | Chou ................. G06F 16/9577 715/205 |
| 2004/0014526 | A1 | 1/2004 | Kulas |
| 2005/0024325 | A1 | 2/2005 | Fleischmann et al. |
| 2007/0039025 | A1 | 2/2007 | Kraft et al. |
| 2008/0059656 | A1 | 3/2008 | Saliba et al. |
| 2009/0076856 | A1 | 3/2009 | Darby et al. |
| 2009/0096573 | A1 | 4/2009 | Graessley |
| 2009/0240666 | A1 | 9/2009 | Noguchi |
| 2009/0257251 | A1 | 10/2009 | Su et al. |
| 2010/0060607 | A1 | 3/2010 | Ludwig |
| 2010/0138797 | A1 | 6/2010 | Thorn |
| 2010/0257251 | A1 | 10/2010 | Mooring et al. |
| 2011/0044438 | A1* | 2/2011 | Wang ................... H04M 11/066 704/E15.005 |
| 2011/0045816 | A1* | 2/2011 | Wang ................... G09B 17/006 455/420 |
| 2011/0145768 | A1 | 6/2011 | Leffert et al. |
| 2011/0163939 | A1 | 7/2011 | Tam et al. |
| 2011/0230178 | A1* | 9/2011 | Jones ................. H04M 1/0241 455/566 |
| 2012/0001928 | A1 | 1/2012 | Sheha et al. |
| 2012/0013524 | A1 | 1/2012 | Stuart et al. |
| 2012/0078788 | A1 | 3/2012 | Gandhi |
| 2012/0083209 | A1* | 4/2012 | Giles ................. H04W 12/082 455/41.2 |
| 2012/0188147 | A1 | 7/2012 | Hosein et al. |
| 2012/0324052 | A1 | 12/2012 | Paleja et al. |
| 2014/0055401 | A1* | 2/2014 | Ye ............................ G06F 3/041 345/173 |
| 2014/0112458 | A1* | 4/2014 | Wang ...................... H04L 67/51 715/728 |
| 2014/0247196 | A1 | 9/2014 | Hosein et al. |
| 2015/0281380 | A1* | 10/2015 | Wang ...................... H04L 67/10 709/204 |
| 2015/0317618 | A1 | 11/2015 | Hatanaka et al. |
| 2016/0057274 | A1 | 2/2016 | Rogitz |
| 2016/0259616 | A1 | 9/2016 | Hosein et al. |
| 2016/0360255 | A1 | 12/2016 | Pontual et al. |
| 2017/0054594 | A1 | 2/2017 | Decenzo et al. |
| 2017/0206498 | A1 | 7/2017 | Hamm et al. |
| 2018/0293044 | A1 | 10/2018 | Hosein et al. |
| 2020/0379708 | A1 | 12/2020 | Hosein et al. |

FOREIGN PATENT DOCUMENTS

| | | |
|---|---|---|
| KR | 1020100053986 | 5/2010 |
| KR | 1020100067296 | 6/2010 |
| KR | 101947199 | 1/2011 |
| RU | 2008100246 | 7/2009 |
| WO | 2006134490 | 12/2006 |
| WO | 2008086275 | 7/2008 |
| WO | 2012092506 | 7/2012 |

OTHER PUBLICATIONS

U.S. Appl. No. 13/340,308 , "Non-Final Office Action received for U.S. Appl. No. 13/340,308, dated Oct. 1, 2013", Oct. 1, 2013, 9 Pages.
U.S. Appl. No. 13/340,308 , "Notice of Allowance received for U.S. Appl. No. 13/340,308, dated Jan. 31, 2014", Jan. 31, 2014, 8 Pages.
U.S. Appl. No. 14/279,145 , "Final Office Action received for U.S. Appl. No. 14/279,145, dated Dec. 16, 2015", Dec. 16, 2015, 6 Pages.
U.S. Appl. No. 14/279,145 , "Non-Final Office Action received for U.S. Appl. No. 14/279,145, dated Jul. 2, 2015", Jul. 2, 2015, 10 pages.
U.S. Appl. No. 14/279,145 , "Notice of Allowance received for U.S. Appl. No. 14/279,145, dated Feb. 16, 2016", Dec. 16, 2016, 8 Pages.
U.S. Appl. No. 15/152,859 , "Applicant Initiated Interview Summary received for U.S. Appl. No. 15/152,859, dated Jan. 31, 2017", Jan. 31, 2017, 3 pages.
U.S. Appl. No. 15/152,859 , "Final Office Action received for U.S. Appl. No. 15/152,859, dated Apr. 7, 2017", Jul. 14, 2017, 10 pages.
U.S. Appl. No. 15/152,859 , "Final Office Action received for U.S. Appl. No. 15/152,859, dated Dec. 14, 2017", Dec. 14, 2017, 6 Pages.
U.S. Appl. No. 15/152,859 , "Non Final Office Action received for U.S. Appl. No. 15/152,859, dated Aug. 25, 2017", Aug. 25, 2017, 11 Pages.
U.S. Appl. No. 15/152,859 , "Non Final Office Action received for U.S. Appl. No. 15/152,859, dated Dec. 15, 2016", Dec. 15, 2016, 10 pages.
U.S. Appl. No. 15/152,859 , "Notice of Allowance received for U.S. Appl. No. 15/152,859, dated Feb. 23, 2018", Dec. 23, 2018, 8 Pages.
U.S. Appl. No. 16/005,229 , "Final Office Action received for U.S. Appl. No. 16/005,229, dated Jan. 8, 2019", Jan. 8, 2019, 14 Pages.
U.S. Appl. No. 16/005,229 , "Non-Final Office Action received for U.S. Appl. No. 16/005,229, dated Jul. 17, 2018", Jul. 17, 2018, 10 pages.
U.S. Appl. No. 16/005,229 , "Non-Final Office Action received for U.S. Appl. No. 16/005,229, dated Jun. 27, 2019", Jun. 27, 2019, 14 Pages.
U.S. Appl. No. 16/005,229 , "Notice of Allowance received for U.S. Appl. No. 16/005,229, dated Apr. 2, 2020", Feb. 14, 2020, 10 pages.
U.S. Appl. No. 16/995,257 , "Non Final Office Action Received for U.S. Appl. No. 16/995,257, dated Jul. 8, 2021", Aug. 17, 2021, 10 pages.
U.S. Appl. No. 16/995,257 , "Notice of Allowance received for U.S. Appl. No. 16/995,257, dated Nov. 5, 2021", Nov. 5, 2021, 8 Pages.

(56) References Cited

OTHER PUBLICATIONS

2011352057, "Office Action received for Australian Patent Application No. 2011352057, mailed on", dated Mar. 23, 2016, 2 Pages.
2011352057, "Office Action received for Australian Patent Application No. 2011352057, mailed on", dated Aug. 2, 2016, 4 Pages.
2011352057, "Office Action received for Australian Patent Application No. 2011352057, mailed on", dated Oct. 6, 2016, 3 Pages.
2011352057, "Response to Office Action filed on Jul. 18, 2016 for Australian Patent Application No. 2011352057, dated Mar. 23, 2016", Jul. 18, 2016, 15 pages.
Lin, et al., "Hand Tracking using Spatial Gesture Modeling and Visual Feedback for a Virtual DJ System", Proceedings of the Fourth IEEE International Conference on Multimodal Interfaces (ICMI'02), 2002, 6 Pages.
PCT/US2011/067927, "International Search Report received for PCT Patent Application No. PCT/US2011/067927, dated Mar. 20, 2012,", Mar. 20, 2012, 3 Pages.
PCT/US2011/067927, "Written Opinion received for PCT Patent Application No. PCT/US2011/067927, dated Mar. 20, 2012", Mar. 20, 2012, 5 Pages.
"Preliminary Amendment for U.S. Appl. No. 16/005,229, filed Jul. 27, 2018", Jul. 27, 2018, 6 Pages.
10-2013-7020395, "Notice of Allowance received for Korean Patent Application No. 10-2013-7020395, dated Nov. 2, 2018", Nov. 2, 2018, 3 Pages.
10-2013-7020395, "Notice of Preliminary Rejection received for Korean Patent Application No. 10-2013-7020395, dated Apr. 5, 2018", Apr. 5, 2018, 5 Pages.
10-2013-7020395, "Response to Office Action filed on Jul. 5, 2018, for Korean Patent Application No. 10-2013-7020395, dated Apr. 5, 2018", Jul. 5, 2018, 30 Pages.
10-2019-7003293, "Notice of Allowance received for Korean Patent Application No. 10-2019-7003293, dated Feb. 26, 2019", Feb. 26, 2019, 3 Pages.
10-2019-7014897, "Office Action Received for Korean Patent Application No. 10-2019-7014897, dated Aug. 21, 2019", Aug. 21, 2019, 6 Pages.
10-2019-7014897, "Response to Office Action Filed on Oct. 18, 2019, for Korean Patent Application No. 10-2019-7014897, dated Aug. 21, 2019", Oct. 18, 2019, 22 Pages.
U.S. Appl. No. 13/340,308, "Response to Non-Final Office Action filed Dec. 16, 2013, for U.S. Appl. No. 13/340,308, dated Oct. 1, 2013", Dec. 16, 2013, 11 Pages.
U.S. Appl. No. 14/279,145, "Applicant Initiated Interview Summary received for U.S. Appl. No. 14/279,145, dated Sep. 30, 2015", Sep. 30, 2015, 3 Pages.
U.S. Appl. No. 14/279,145, "Response to Final Office Action filed Jan. 26, 2016, for U.S. Appl. No. 14/279,145, dated Dec. 16, 2015", Jan. 26, 2016, 8 Pages.
U.S. Appl. No. 14/279,145, "Response to Non Final Office Action filed Oct. 2, 2015, for U.S. Appl. No. 14/279,145, dated Jul. 2, 2015", Oct. 2, 2015, 12 Pages.
U.S. Appl. No. 15/152,859, "Response to Final Office Action filed Jan. 24, 2018, for U.S. Appl. No. 15/152,859, dated Dec. 14, 2017", Jan. 24, 2018, 9 Pages.
U.S. Appl. No. 15/152,859, "Response to Final Office Action filed Jul. 7, 2017, for U.S. Appl. No. 15/152,859, dated Apr. 7, 2017", Jul. 7, 2017, 11 Pages.
U.S. Appl. No. 15/152,859, "Response to Non Final Office Action filed Jan. 27, 2017, for U.S. Appl. No. 15/152,859, dated Dec. 15, 2016", Jan. 27, 2017, 12 Pages.
U.S. Appl. No. 15/152,859, "Response to Non Final Office Action filed Nov. 27, 2017, for U.S. Appl. No. 15/152,859, dated Aug. 25, 2017", Nov. 27, 2017, 14 Pages.
U.S. Appl. No. 16/005,229, "Advisory Action Received for U.S. Appl. No. 16/005,229, dated Feb. 13, 2020", Feb. 13, 2020, 2 Pages.
U.S. Appl. No. 16/005,229, "Amendment After Notice of Allowance Under 37 CFR filed Jul. 1, 2020 U.S. Appl. No. 16/005,229", dated Jul. 1, 2020, 4 Pages.
U.S. Appl. No. 16/005,229, "Applicant Initiated Interview Summary received for U.S. Appl. No. 16/005,229, dated Feb. 15, 2019", Feb. 15, 2019, 3 Pages.
U.S. Appl. No. 16/005,229, "Applicant Initiated Interview Summary Received for U.S. Appl. No. 16/005,229, dated Feb. 27, 2020", Feb. 27, 2020, 3 Pages.
U.S. Appl. No. 16/005,229, "Applicant Interview summary received for U.S. Appl. No. 16/005,229,dated Sep. 27, 2019", Sep. 27, 2019, 3 Pages.
U.S. Appl. No. 16/005,229, "Corrected Notice of Allowability received for U.S. Appl. No. 16/005,229, dated May 28, 2020", May 28, 2020, 2 Pages.
U.S. Appl. No. 16/005,229, "Final Office Action Received for U.S. Appl. No. 16/005,229, dated Dec. 12, 2019", Dec. 12, 2019, 13 Pages.
U.S. Appl. No. 16/005,229, "PTO Response to rule 312 Communication Received for U.S. Appl. No. 16/005,229, dated Jul. 17, 2020", Jul. 17, 2020, 3 Pages.
U.S. Appl. No. 16/005,229, "Response to Advisory Action filed Mar. 12, 2020 for U.S. Appl. No. 16/005,229, dated Feb. 13, 2020", Mar. 12, 2020, 8 Pages.
U.S. Appl. No. 16/005,229, "Response to Final Office Action filed Feb. 6, 2020 for U.S. Appl. No. 16/005,229, dated Dec. 12, 2019", Feb. 6, 2020, 9 Pages.
U.S. Appl. No. 16/005,229, "Response to Final Office Action filed May 6, 2019 for U.S. Appl. No. 16/005,229,dated Jan. 8, 2019", May 6, 2019, 13 Pages.
U.S. Appl. No. 16/005,229, "Response to Non-Final Office Action filed Sep. 27, 2019, for U.S. Appl. No. 16/005,229, dated Jun. 27, 2019", Sep. 27, 2019, 10 pages.
U.S. Appl. No. 16/005,229, "Response to Non-Final Office Action filed Oct. 17, 2018, for U.S. Appl. No. 16/005,229, dated Jul. 17, 2018", Oct. 17, 2018, 12 Pages.
2,823,542, "Notice of Allowance received for Canada Patent Application No. 2,823,542, dated Jun. 26, 2018", Jun. 26, 2018, 1 Page.
2,823,542, "Office Action received for Canadian Patent Application No. 2,823,542, dated May 30, 2017", May 30, 2017, 3 Pages.
2,823,542, "Response to Office Action filed Nov. 30, 2017 for Canadian Patent Application No. 2823542, dated May 30, 2017", Nov. 30, 2017, 15 Pages.
2011352057, "Notice of Allowance received for Australian Patent Application No. 2011352057, dated Feb. 10, 2017", Feb. 10, 2017, 3 Pages.
2011352057, "Response to Office Action filed Jan. 17, 2017 for Australian Patent Application No. 2011352057, dated Oct. 6, 2016", Jan. 17, 2017, 18 Pages.
2011352057, "Response to Office Action filed Sep. 20, 2016 for Australian Patent Application No. 2011352057, dated Aug. 2, 2016", Sep. 20, 2016, 17 Pages.
2013135714, "Notice of Decision to Grant Received for Russian Patent Application No. 2013135714, dated Nov. 25, 2015", Nov. 25, 2015, 13 Pages.
5511/CHENP/2013, "First Examination Report Received for Indian Patent Application No. 5511/CHENP/2013, dated Nov. 11, 2019", Nov. 11, 2019, 7 Pages.
5511/CHENP/2013, "Response to First Examination Report Filed on May 6, 2020 for Indian Patent Application No. 5511/CHENP/2013, dated Nov. 11, 2019", May 6, 2020, 22 Pages.
Arksey, "Exploring the Design Space for Concurrent Use of Personal and Large Displays for In-Home Collaboration", Retrieved from the Internet URL: <https://www.cs.ubc.ca/labs/imager/th/2007/ArkseyMscThesis/Arksey_Nicole.pdf>, Aug. 2007, 228 Pages.
PCT/US2011/067927, "International Preliminary Reporton Patentability received for PCT Application No. PCT/US2011/067927, dated Jul. 11, 2013", Jul. 11, 2013, 7 Pages.
Smith, Tony, "Ricoh Readies 'Flick To Transfer' Photo App", Ping Pictures From One Iphone To Another, Jun. 30, 2010, 1 Page.

\* cited by examiner

METHODS AND SYSTEMS FOR DISPLAYING CONTENT ON MULTIPLE NETWORKED DEVICES WITH A SIMPLE COMMAND

CROSS-REFERENCE TO RELATED APPLICATIONS

This application is a continuation of U.S. patent application Ser. No. 16/995,257, filed on Aug. 17, 2020, which is a continuation of U.S. patent application Ser. No. 16/005,229, filed on Jun. 11, 2018, which is a continuation of U.S. patent application Ser. No. 15/152,859, filed on May 12, 2016 which is a continuation of U.S. patent application Ser. No. 14/279,145, filed on May 15, 2014, which is a continuation of U.S. patent application Ser. No. 13/340,308, filed on Dec. 29, 2011, now U.S. Pat. No. 8,749,452, which claims priority to U.S. Provisional Application No. 61/429,097, filed Dec. 31, 2010. The entire contents of these applications are incorporated herein by reference.

BACKGROUND

Technical Field

Embodiments disclosed herein relate to methods and systems for displaying content on multiple paired devices with a simple command.

Related Art

As internet-capable devices become smaller and more portable, users increasingly have these internet-capable devices with them almost all of the time, even when at home. The internet-capable devices are with the users at the dinner table and in the family room. It is not an uncommon sight to see a user using such an internet-capable device while watching, or while others are watching, television. As televisions become larger and have more features, such as internet connectivity of their own, a user of an internet-capable device may strain to see the text and pictures displayed on the limited size of their internet-capable device, and desire to see the text and pictures displayed on the typically larger display of the television. Currently, if the television has internet connectivity, either natively or through a connected internet appliance, such as a Sony® PlayStation™ 3, a Microsoft® Xbox 360™, a Nintendo® Wii™, an AppleTV™ device, GoogleTV™ device, or a cable or satellite provider set top box, a user can navigate using a web browser executing either natively on the television or on the internet appliance to view the same pictures and text that were displayed on the user's internet-capable device.

However, depending on the sophistication of input options available for the television or internet appliance, this may take time and require undue effort from the user. Alternatively, a user may be able to use a wired connection between the internet-capable device and the television to display the text, pictures, and other content displayed on the internet-capable device on the television. Again, this requires that the internet-capable device be capable of outputting a signal to the television, the television must be capable of receiving an input signal from the internet-capable device and, if there are multiple components involved, this process can further require changing television, receiver, DVR, and other settings, and/or plugging and unplugging of various cables.

BRIEF DESCRIPTION OF THE FIGURES

Wherever possible, the same reference numbers are used throughout the drawings to refer to the same or like elements.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

What is needed is a simple, fast, and effective way to display the text, pictures, and other content displayed on an internet-enabled device onto a television requiring minimal effort and setup by the user.

Consistent with some embodiments, there is provided a system. The system includes a memory, and one or more processors, wherein the one or more processors are configured to cause the system to pair a first device to a second device when a request to display content currently displayed on the first device on the second device is received, the request comprising a gesture made on the first device. The one or more processors may also be configured to cause the system to transmit instructions to the second device to display the content currently displayed on the first device, and transmit the content currently displayed on the first device to the second device for display thereon.

Consistent with some embodiments, there is also provided a method. The method includes steps of pairing a first device to a second device when a request to display content currently displayed on the first device on the second device is received, the request comprising a gesture made on the first device, transmitting instructions to the second device to display the content currently displayed on the first device, and transmitting the content currently displayed on the first device to the second device for display thereon. The method may be embodied in computer-readable media.

Consistent with some embodiments, there is further provided a method including steps of pairing at least one first device to at least one second device when a request to display content currently displayed the at least one first device on the at least one second devices is received from the first device, transmitting instructions to the at least one second device to display the content currently displayed on the first device, transmitting the content currently displayed on the at least one first device to the at least one second device for display thereon, and transmitting information related to the content to the at least one second device for display along with the content, the information determined from metadata associated with the content. The method may also be embodied in computer-readable media.

Embodiments as described herein may include an internet-capable device that includes a memory and a processor, the processor executing instructions included in the memory for performing methods as described herein. Consistent with some embodiments, the internet-capable device may be a mobile device, such as a mobile phone or smartphone running the iOS™ operating system, the Android™ operating system, Windows™ Mobile™ operating system, a BlackBerry™ operating system, or webOS™ Alternatively, the mobile device may be a tablet computer such as the Apple® iPad™ or the Samsung® Galaxy™ tablet. Consistent with some embodiments, the memory of the mobile device is capable of storing applications that, when executed by the processor, perform methods as described herein. Consistent with some embodiments, the mobile device may include any appropriate combination of hardware and/or software having a processor and capable of reading instructions stored on a non-transitory machine-readable medium for execution by the processor. Some common forms of machine-readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. Applications stored in the memory or machine-readable media may be downloaded or purchased from application repositories such as the Apple® App Store™, Android™ MarketPlace™, or Amazon Appstore. Such instructions may allow the sharing of content from the mobile device to a second device using a simple gesture and the pairing or coupling of the mobile device to a second device.

Figure 1:
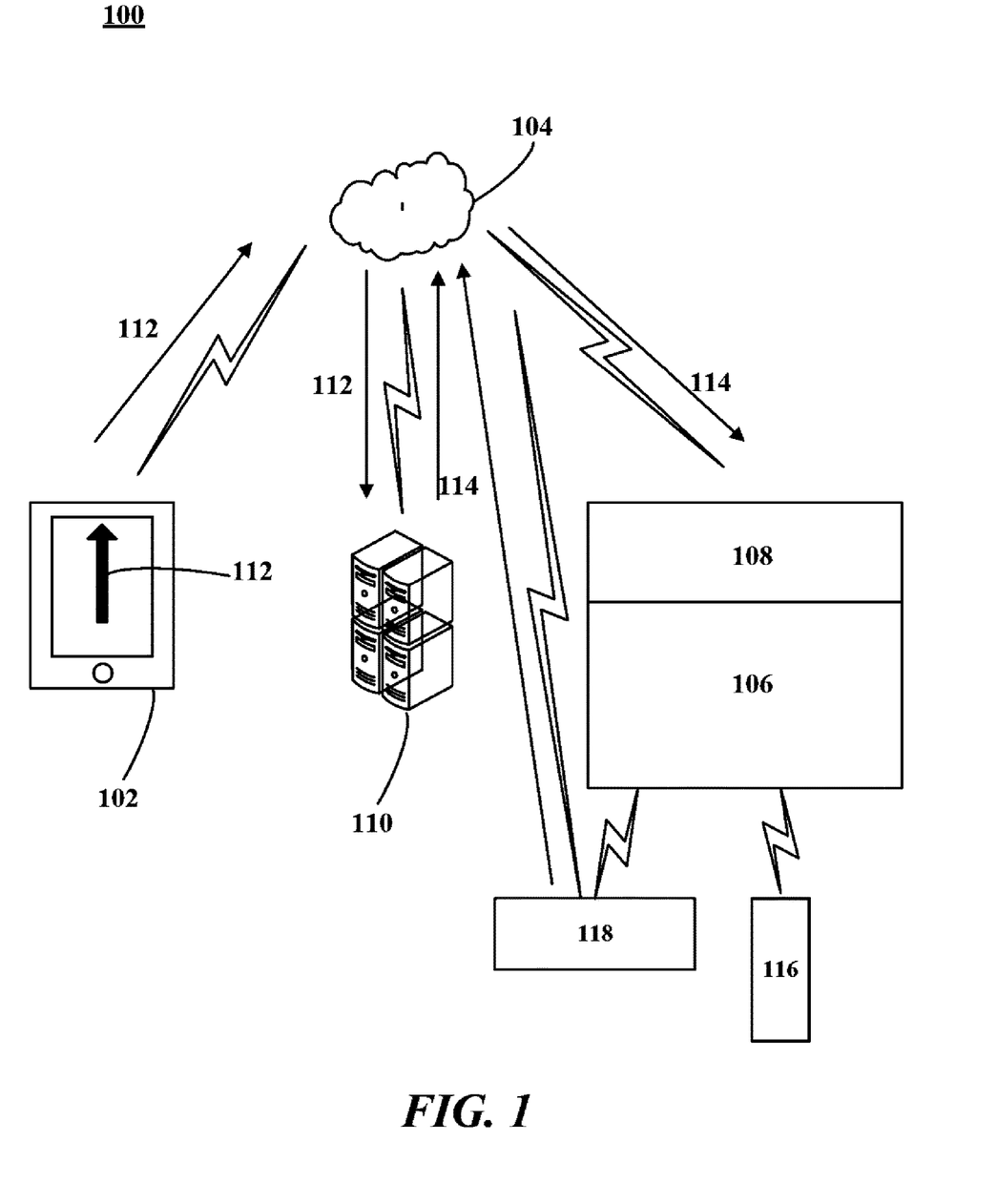
FIG. 1 is an illustration of a system consistent with some embodiments.

Further consistent with some embodiments, televisions as described herein may be internet-capable televisions having a memory and a processor, wherein the memory is capable of storing applications or widgets that, when executed by the processor, perform methods as described herein. The internet-capable televisions may include an operating system that is the same as or compatible with one or more of the mobile phone or small phone operating systems described above. Moreover, the applications or widgets executed on the internet-capable television may be downloaded from one or more application repositories. In other embodiments, televisions may have internet-capability via a connection to the internet through an internet appliance such as a DVR, an AppleTV™ device, a GoogleTV™ device, a console gaming system such as a Sony® PlayStation™ 3, a Microsoft® Xbox 360™, or other cable or satellite provider set-top box. Moreover, the internet appliance may also include a memory and a processor, wherein the memory is capable of storing applications or widgets that, when executed by the processor, perform methods as described herein. The applications or widgets may be downloaded from application repositories. Applications and widgets executing on any or all of first device 102, second device 106, or remote server 110 may be written and developed for specific platforms (e.g., iOS or Android), or they may be developed using hypertext markup language (HTML) 5, and available across multiple platforms.

FIG. 1 is an illustration of a system 100 consistent with some embodiments. As shown in FIG. 1, a first internet-capable device 102 is coupled to the network 104. The connection may be wireless through a wireless data protocol such as Wi-Fi™, 3G, 4G, HDSPA, LTE, RF, NFC, or through a wired connection. As discussed above, first device 102 may be a mobile device such as an iPhone™ or iPad™ or other mobile device running the iOS™ operating system, the Android™ operating system, a BlackBerry™ operating system, or PahmOS™. First device 102 may also be a personal computer, laptop computer, netbook, or tablet computer. Moreover, network 104 may be a local area or wide area network, or may simply referred to as "the cloud".

Returning to FIG. 1, a second internet-capable device 106 is also coupled to network 104. As with first device 102, second device 106 may also be coupled to network 104 wirelessly or through a wired connection. Second device 106 may also include a memory and a processor, wherein the memory is capable of storing instructions such as applications or widgets that, when executed by the processor, perform methods as described herein. Consistent with some embodiments, second device 106 may be a internet-capable television or have may have internet-capability via a connection to the internet through an internet appliance 108 such as a DVR, an AppleTV™ device, a GoogleTV™ device or other satellite or cable provider set-top box. Moreover, internet appliance 108 may also include a memory and a processor, wherein the memory is capable of storing applications or widgets that, when executed by the processor, perform methods as described herein. Consistent with some embodiments, the instructions stored in memory of second device 106 and/or internet appliance 108 may provide a user interface for viewing content displayed at second device 106. The user interface may facilitate the browsing of the content and/or the purchasing and bidding of consumer content. Moreover, the instructions may facilitate the coupling or pairing of second device 106 to first device 102.

System 100 further includes remote server 110 also coupled to network 104. Remote server 110 may be coupled to internet through any wired or wireless connection. Moreover, remote server 110 may further include a memory and a processor, wherein the memory includes instructions for execution by the processor for performing methods as described herein. An example of computer-executable instructions which may be used, at least in part, to perform methods as described herein is disclosed in U.S. Provisional Application No. 61/429,097, filed Dec. 31, 2010, the entire contents of which are incorporated herein by reference. Such computer-readable instructions may be part of the instructions executed by remote server 110 to perform methods as described herein. In particular, remote server 110 may include instructions for creating a dedicated coupling between first device 102 and second device 106 through the cloud 104, and facilitating communications between first device 102 and second device 106. Consistent with some embodiments, first device 102 may be directly coupled to second device 106 through a wired or wireless connection, or through the cloud 104. Furthermore, remote server 110 may support data conversion, normalization and marshalling of data between different platforms. Remote server 110 may also support networking between different platforms, and include instructions stored in a memory for creating and revoking couplings, pairings and associations between many devices, including first device 102 and second device 106. In addition, remote server 110 may include instructions in a memory for execution by a processor that supports the generation and transmission of notification events to first device 102 and second device 106.

Returning to FIG. 1, once first device 102 and second device 106 have been coupled or paired through remote server 110, a user of first device 102 may facilitate interactions between first device 102 and second device 106. For example, a user of first device 102 may be viewing content at first device 102, and wish to view content on second device 106. Remote server 110 includes instructions stored in memory that when executed by the processor facilitates the viewing of content displayed on device 102 on television 106 in response to a user command 112 made at first device 102. Consistent with some embodiments, user command 112 may be a gesture made by a hand or finger of user, or by a stylus handled by user. According to some embodiments, first device 102 may have a capacitive or other touch screen capable of sensing a user touch, and user command may be a "flick" gesture made on the touch screen of first device 102. Remote server 110 registers user command 112 and then provides instructions 114 to second device 106 to display the content currently displayed on first device 102. In some embodiments, first device 102 sends content along with user command 112, such that the content is also provided to second device 106 along with instructions 114. In other embodiments, instructions 114 include a destination web address or other content location to television 106 such that the content currently displayed on first device 102 is also displayed on second device 106.

Once the content is displayed on second device 106, a user may interact with the content displayed on second device 106 using first device 102, or a controller 116 capable of controlling second device 106 or internet appliance 108. Controller 116 may be a remote control or a joystick or other suitable device. Consistent with some embodiments, first device 102 may include instructions stored in its memory that, when executed by its processor, allows first device 102 to act as controller 116. Such instructions may be a separate remote control application, part of the instructions executing on a processor of first device 102, or part of the instructions executing on remote server 110 that allows direct communication between first device 102 and second device 106. For example, a user can use controller 116 or first device 102 to browse content, select content for purchase or bidding, or request notifications and updates regarding content. Control of the content may be passed between first device 102 and controller 116 of second device 106 via commands issued at first device 102 or controller 116. Consistent with some embodiments, requested notifications and updates may be displayed at second device 106 while viewing content, or when content is not being viewed, being unobtrusively displayed during the normal operation of second device 106.

Consistent with some embodiments, form fields requesting information from the user may be displayed on either first device 102 or second device 106, or both, wherein a user can complete the form fields on either device. Examples of form fields include login and password information, search boxes, etc. Consistent with some embodiments, a user can be filling in a form field displayed on second device 106 by entering the information on first device 102. Alternatively, for additional privacy, the form fields could only be displayed on first device 106 for entry on first device 106. Upon completion of the form fields, the information can be transmitted to network 104 (the cloud). In some embodiments, a user can enter information into a form field displayed on second device 106 using controller 116, and the entered information can be transmitted to, and displayed on, first device 102, or vice versa.

Once a user is finished viewing content on second device 106, a user may enter a command at either first device 102 or second device 106 using controller 116 to remove the content from second device 106. For example, a user may make a "flick" gesture on a touch screen of first device 102 in an opposite direction to remove the content from second device 106. According to some embodiments, the content that was being displayed on second device 106 will be displayed on first device 106, in the same state as it was on first device 106. For example, a user may be browsing a web page on first device 106 and wish to see the web page on a larger screen which second device 106 may have. The user can then make the flick gesture 112 to send the displayed content to second device 106. The user can then use first device 102 to navigate through the content displayed on second device 106 to, for example, follow a link to different webpage or different content. The user can then end issue a command on first device 106 to remove the webpage or content from second device 106 such that it is displayed on first device 102 in the same state as it was displayed on second device 106, providing a seamless "round-trip" content viewing experience for the user.

Figure 2:
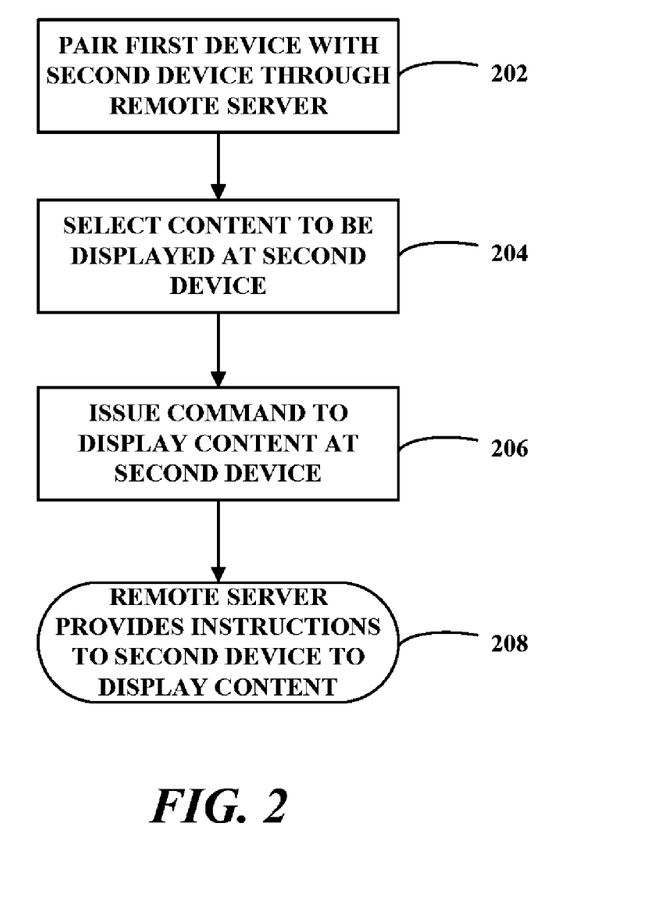
FIG. 2 is a flowchart illustrating a method of displaying content currently displayed at a first device at a second device coupled to the first device.

FIG. 2 is a flowchart illustrating a method of displaying content currently displayed at a first device at a second device coupled to the first device. The method illustrated in FIG. 2 will be explained in conjunction with system 100 shown in FIG. 1, but the illustrated method is not limited to use with system 100. Initially, first device 102 and second device 106 connect to remote server 110 and are paired (Step 202). The pairing may be accomplished by prompting a user at first device 102 and second device 106 to enter a PIN Number or a password. Alternatively, pairing may be accomplished by using a challenge question generated by a user at first device 102 and answered by user at second device 106, or vice versa. Once first device 102 is paired with second device 106, the devices do not have to be paired again. However, according to some embodiments, second device 106 may prompt a user at second device 106 to accept a request to be paired with first device 102 before allowing content to be displayed on second device 106. According to some embodiments, first device 102 may be paired with multiple devices including second device 106 and, such that first device 102 selects the device amongst the multiple paired devices on which to display content currently displayed at first device 102. Similarly, multiple devices may be paired with second device 106.

Consistent with some embodiments, geofencing may be used to pair first device 102 with a second device 106 based on location. For example, a user may have a "second device" 106 in multiple rooms of a residence or in multiple locations, such as home and office. Consequently, using global positioning system (GPS) functionality of first device 102, first device 102 may determine a current location and then pair to the second device 106 that is closest in location. For example, if a user is viewing content at home on a first device 102, first device 102 will pair with second device 106 at home. Then, when the user travels to the office, first device 102 will pair with a second device 106 at the office. The geofencing example may be extended within the user's house or office such that first device 102 pairs with specific second devices 106 based on what room first device 102 is in. Moreover, first device 102 may be paired with compatible second devices 106 at public locations, transports, stadiums, airplanes, etc.

Returning to FIG. 2, after first device 102 has been paired to second device 106, and, if multiple devices have been paired with first device 102, the desired device for display has been selected or the second device 106 located closest to first device 102, the user selects content to display at second device 106 (Step 204). A user may use a tap gesture on device 102 to select the content to be displayed at second device 106 in some embodiments. Next, the user issues a command or request 112 to display the content currently displayed on first device 102 on second device 106 (Step 206). As discussed above, a user command 112 may be a gesture made by a hand or finger of user, or by a stylus handled by user. According to some embodiments, device 102 may have a capacitive or other touch screen capable of sensing a user touch, and user command may be a "flick" gesture made on the touch screen of device 102. The content currently displayed on first device 102 is then displayed on second device 106 (Step 208). Consistent with some embodiments, user command 112 is received by remote server 110, which provides instructions 114 to second device 106 to display the content currently displayed on first device 102. In some embodiments, first device 102 sends content along with user command 112, such that the content is also provided to second device 106 along with instructions 114. In other embodiments, instructions 114 include a destination web address or other content location to second device 106 such that the content currently displayed on first device 102 is also displayed on second device 106. Consistent with some embodiments, first device 102 and second device 106 are paired directly or through the cloud 104, and the content and instructions are set directly from first device 102 to second device 106.

Once the user is finished looking at the content being displayed on second device 106, the user enters a command to stop displaying content on second device (Step 210). At this point, the content being displayed on second device 106 is now displayed on first device 102, in the same state as it was displayed on second device 106 (Step 212). Consistent with some embodiments, once the content is no longer displayed on second device 206, the pairing or connection between first device 102 and second device 106 can be terminated.

Figure 3A:
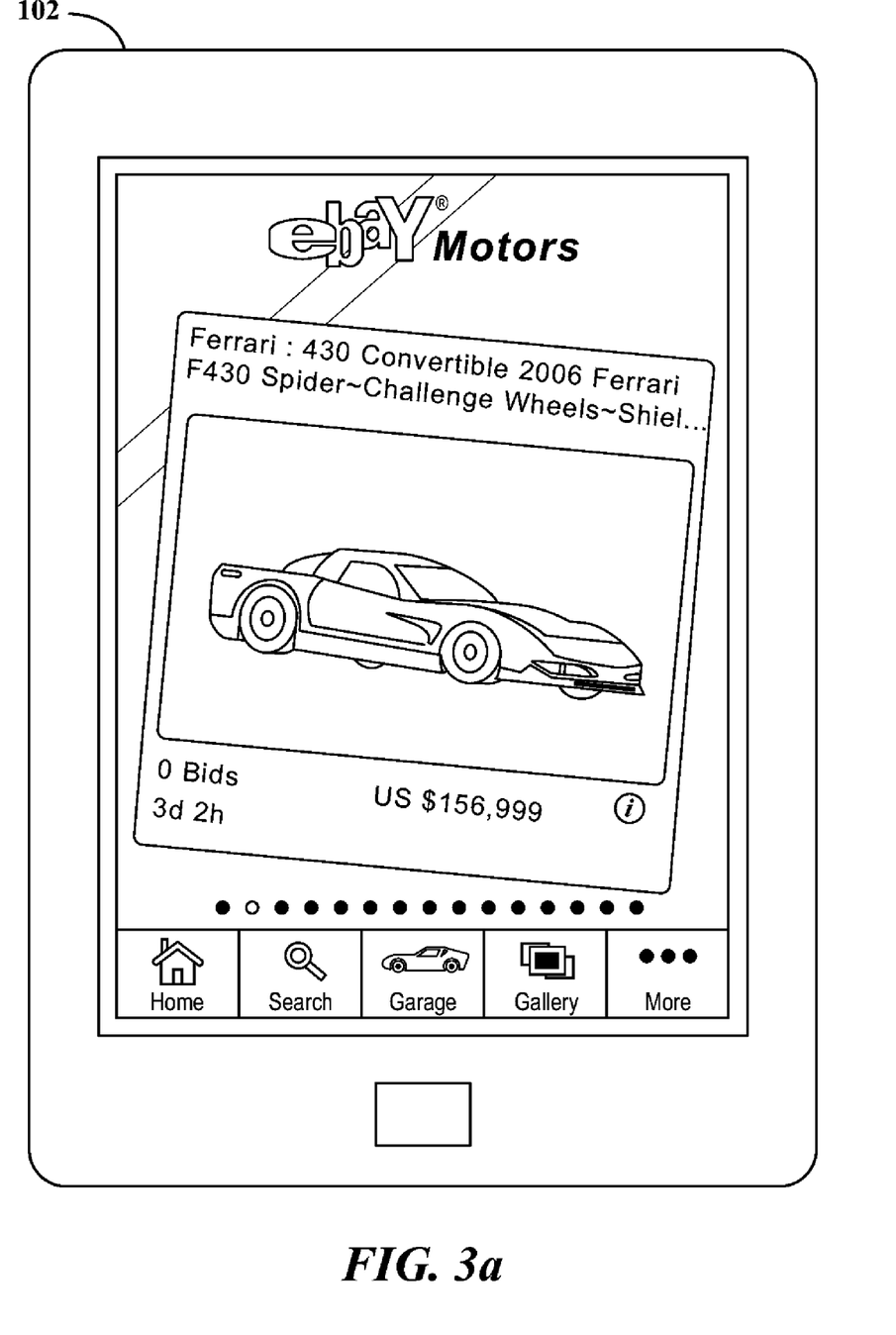
FIGS. 3a-3g illustrate an example of using the system illustrated in FIG. 1.

FIGS. 3a-3g illustrate an example of using system 100. As shown in FIG. 3a, a user may have device 102, such as an iPhone™ or other smartphone which includes instructions for displaying content on a secondary device such as television 106. Such instructions may be standalone instructions, or as part of a larger set of instructions. For example, as shown in FIG. 3a, a user may be viewing automobiles available for purchase using the eBay™ Motors App™. Using this app, a user may view a slideshow of available automobiles from the eBay™ database, and can scroll through different automobiles making a side-to-side swipe command on the touch screen of first device 102.

Figure 3B:
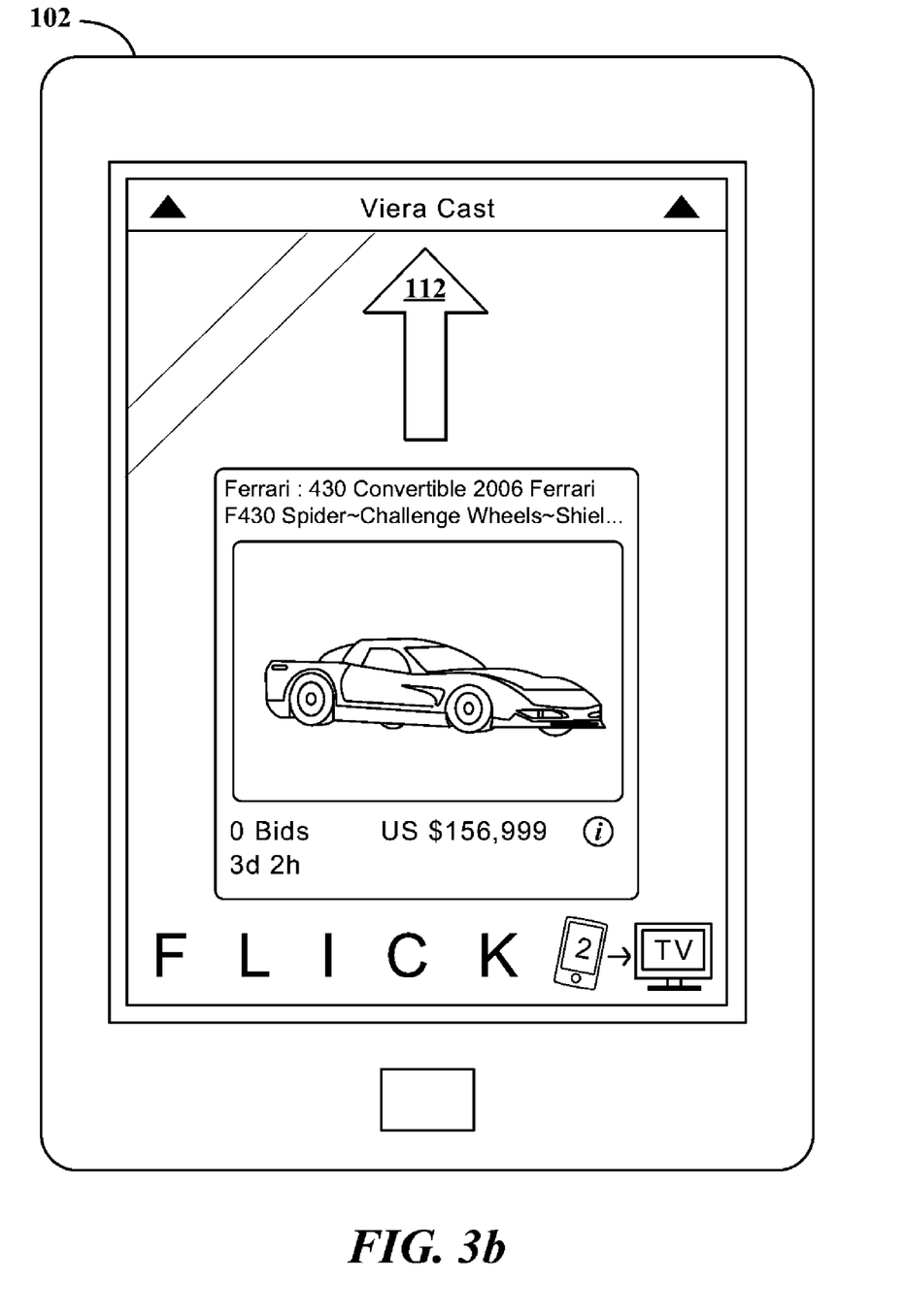

As shown in FIG. 3b, a user may issue a command, such as a tap gesture, on the touch screen to place the application into remote viewing preparation mode. The user may then cancel the preparation mode by issuing another command on first device 102, such as another tap gesture. However, if the user is ready to view the content displayed on first device 102 on second device 106, shown as a television, user then issues command 112, which may be a "flick" gesture, on the screen of first device 102. Instructions 114 are then provided to television for viewing the content displayed at device.

Figure 3C:
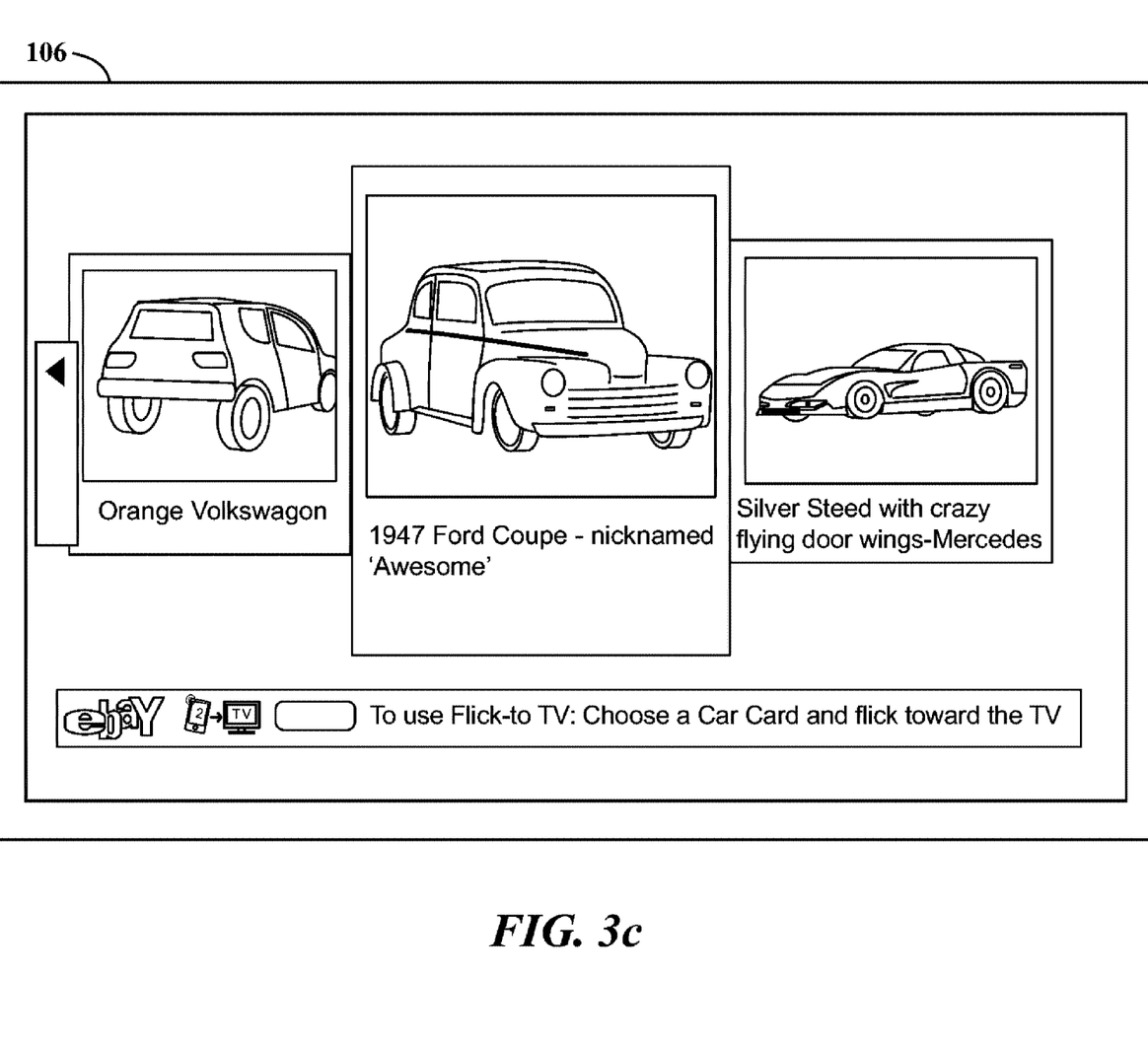

FIG. 3c illustrates content displayed on second device 106. Consistent with some embodiments, user may use controller 116 or first device 102 to navigate through content by selecting particular automobiles using an "OK" or "Enter" button displayed. Similarly, left and right arrows may be used to navigate from side-to-side amongst the displayed automobiles.

Figure 3D:
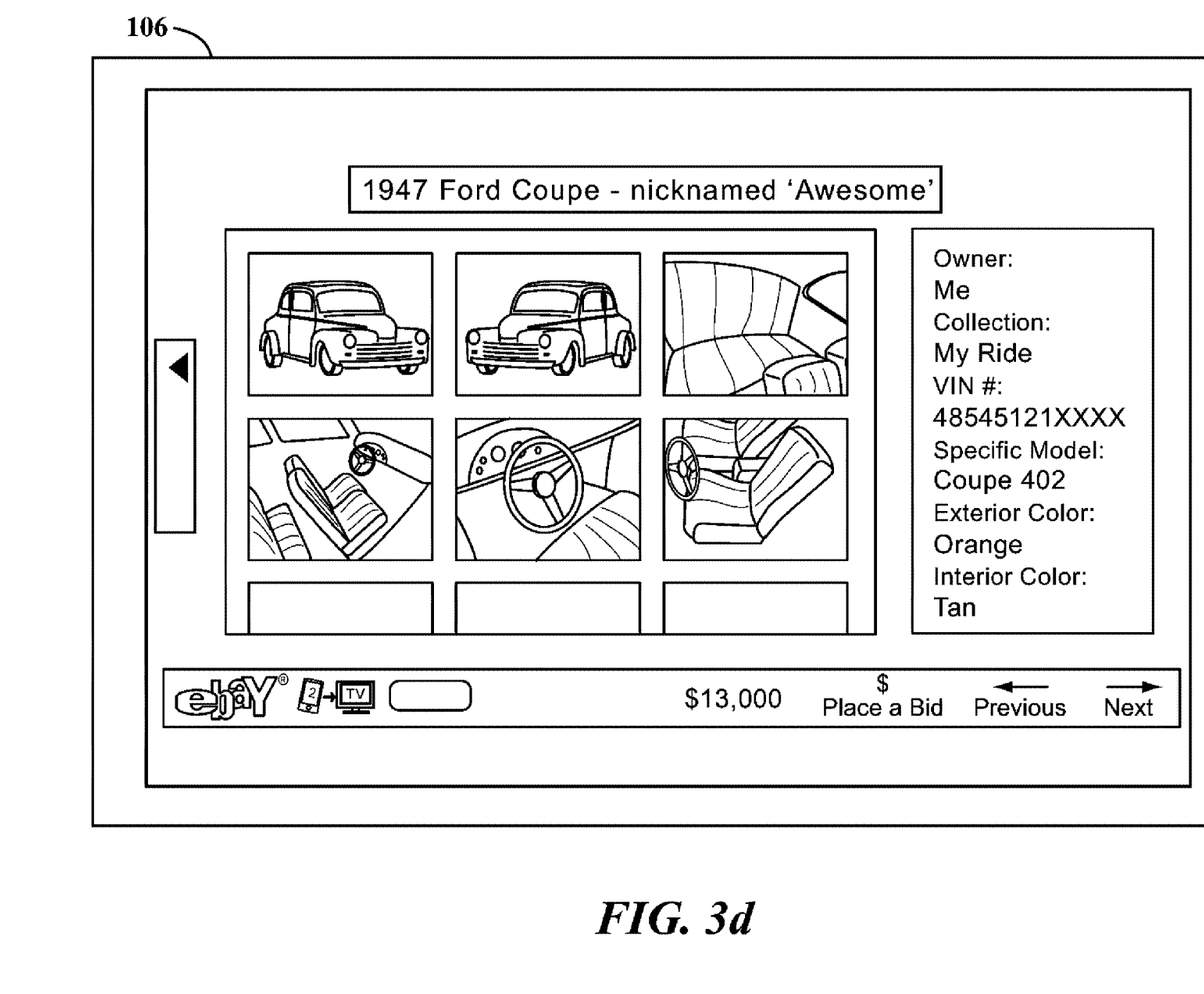

As shown in FIG. 3d, a selected automobile may have additional details, navigable and selectable by the user. This includes selecting content for display in a full screen mode. The user may then return to the previous screen by selecting a "Return" or "Back" option. For the illustrated example, the user may also be able to perform such functions as purchase, bid on, or otherwise inquire about the automobile displayed at second device 106. According to some embodiments, a user may be able to purchase or bid on the displayed automobile by making a "flick" gesture from a money icon displayed on first device 102, similar to the "flick" gesture made to display the content on second device 106, such as described in U.S. application Ser. No. 12/892,234, assigned to eBay, Inc., the contents of which are hereby incorporated by reference in their entirety. Alternatively, a user at second device 106 may be able to click a button displayed on second device 106, first device 102, or controller 116, to buy or bid on the displayed content.

Figure 3E:
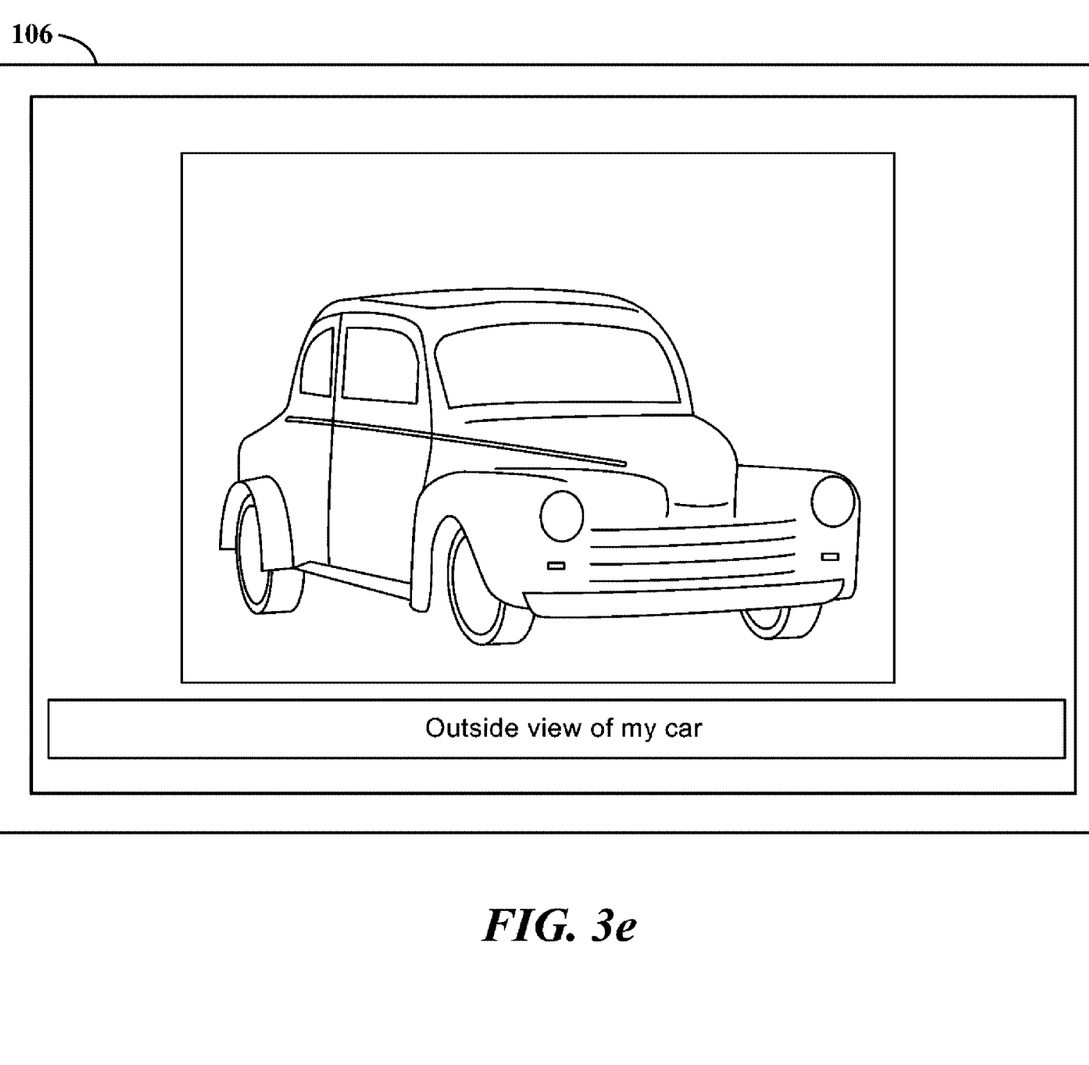

FIG. 3e illustrates content selected by the user for display in a full screen mode. In order to display content in a full screen mode, user navigates to the desired content, shown in FIG. 3d for example, and then selects the "OK" button. Once the user is finished viewing the content in a full screen mode, the user may select a "Return" or "Back" button to return to the previously displayed screen, which for example may be the screen shown in FIG. 3d. Although not shown in FIG. 3e, there may be additional options available for a user to select, such as, for example, a chat button, which would allow the user to chat with friends online. The chat button may allow a user to use any of the typical chat protocols and platforms, and then allow the user, for example, to send an instant message to their friends showing them the content displayed at second device 106. Alternatively, there may be social network integration displayed on the screen, allowing a user to send a link to the content displayed at second device over a social networking platform such as Facebook™, Twitter™, or Google+™.

Figure 3F:
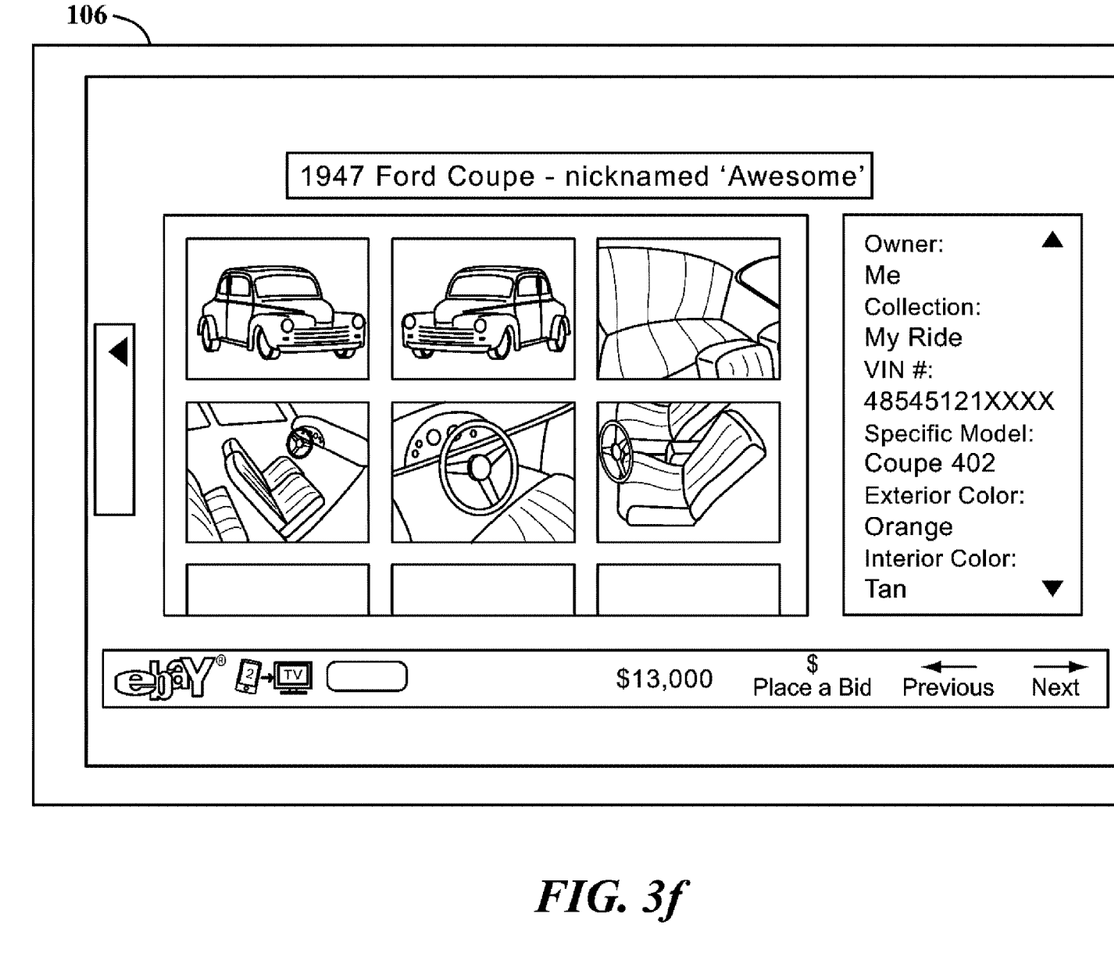
Figure 3G:
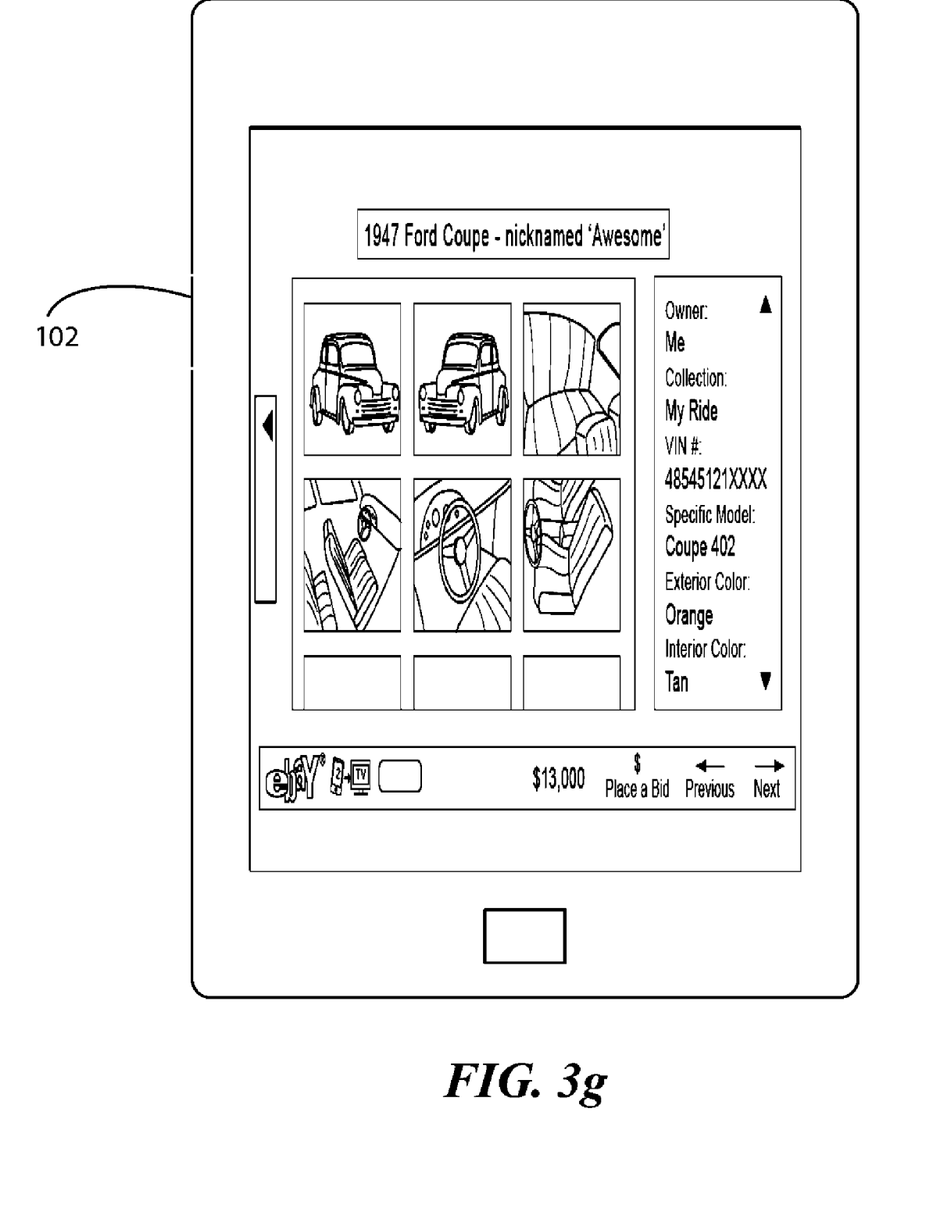

FIG. 3f illustrates a display similar to the display shown in FIG. 3d. However, in FIG. 3f, a user may navigate to the right of the screen to view additional details about the selected automobile. The user may then further view additional details using the up and down navigation arrows, and may navigate back to the content and out of the additional details window. Then, when a user decides to stop viewing content on second device 106, the user can enter a command on first device 102 or second device 106 to stop displaying the content on second device 106, and display the content on first device. FIG. 3g illustrates the same display as shown in FIG. 3f, in the same state, but now being viewed on first device 102.

Although the example illustrated in FIGS. 3a-3g illustrate displaying automobile auctions from a mobile device to a television, the example is not limiting. Consistent with some embodiments, the auctions may be any type of auction, and the devices may be any internet-capable device. Moreover, the content displayed at first device 102 may include metadata having specific information about the content being displayed such that a user may be able to display information related to the content at the second device, or vice versa. For example, a user may be streaming a movie over the internet at first device 102 or second device 106 and scene having a particular object may be displayed. Remote server 110 may detect this particular object and send information to either first device 102 or second device 106 about this particular object. Such information may include online auctions for the particular object. Alternatively, such contextual information about the content may allow a user currently streaming a movie to stop the movie and proceed to an online store or auction provider wherein items contextually related to the movie or scene the user was currently at is displayed.

Moreover, system 100 may be used in conjunction with other peripherals. For example, user command 112, which may be a "flick" gesture, may be extended to other gestures when using motion capturing peripherals. For example, a user having a motion capture device 118 such as the Microsoft® Xbox™ Kinect™ coupled to internet appliance 108 may first display content on second device 106, and then use gestures that are captured by the motion capture device and interpreted by remote server 110 to navigate through the display. Furthermore, using motion capture devices 118 such as the Xbox™ Kinect™ coupled to internet appliance 108, a user may navigate through online shops and auctions of clothes or other items, select one, and then view on second device 106 what the user may look like wearing the item, creating a virtual dressing room. These features may be enabled by remote server 110, which can be configured to interpret user commands, gestures, motions, etc. to interact with other existing platforms. In addition to the Xbox™ Kinect™ other motion capture devices such as the Nintendo® Wii™ WiiMote™, or Sony® PlayStation™ Move™, may be used.

Consistent with some embodiments, system 100 may be used in situations where first device 102 is remote from second device 106. For example, if a user at a first location wishes to share the content at first device 102 with a user of second device 106 at a second location, the user can issue command 112 and, as long as first device 102 and second device 106 are coupled to network 104, the content can be shared and displayed at second device. To prevent unauthorized or unwanted sharing of content between first device 102 and second device 106, the user of second device may be presented with a prompt at second device 106 asking whether the user of second device 106 wants to accept the content being shared by the user of first device 106.

Sharing between devices may also be accomplished by quick response (QR) codes. Consistent with some embodiments, the content being displayed on second device 106, as shared by first device 102 via gesture 112, may be shared to other users with mobile devices. For example, a user of first device 102 may wish to show other users with mobile devices content currently displayed on first device 102. User may make gesture 112 to display content on second device 106. Then, instructions stored at remote server 110, in first device 102, or second device 106, may generate a QR code associated with the content. The generated QR code can then be displayed on second device 106 along with the content. Other users within the vicinity of second device 106 can then scan the QR code with their mobile devices and view the associated content on their mobile devices.

Additional embodiments may allow multiple users with paired first devices 102 to each individually share content on second device 106. For example, if multiple users have first devices 102, which may be smartphones according to an embodiment, are all within vicinity of a second device 106, which may be an internet-enabled television according to an embodiment, they may pair their devices to second device 106 to each share content to second device 106. Each user may then make a gesture 112 to share content on second device 106. Consistent with some embodiments, second device 106 may display the shared content individually, pairing solely with one first device 102 at a time, or second device may pair with all of the first devices 102 in the vicinity and display the shared content in a split screen manner. Further consistent with some embodiments, either the sharing first device 102 may control the content displayed on second device 106, or any of the paired first devices 102 may control the content displayed on second device 106.

Further consistent with some embodiments, second device 106 may display further information related to the content displayed on second device 106. Consistent with some embodiments, second device 106 may execute instructions stored within its internal memory to parse the metadata or software code related to the displayed content, and search the internet for additional information regarding the displayed content, and display this additional information on second device 106. This additional information may include searched auctions listed on an online marketplace such as provided by eBay, Inc. of San Jose, Calif., for merchandise related to the displayed content. Further consistent with such embodiments, the user may be able to interact with the additional information. For example, if the additional information is related to an online auction, the user may place a bid on the merchandise being displayed that is related to the displayed content.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more machine readable mediums, including non-transitory machine readable medium. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

Embodiments described herein are exemplary only. One skilled in the art may recognize various alternative embodiments from those specifically disclosed. Those alternative embodiments are also intended to be within the scope of this disclosure. As such, the embodiments are limited only by the following claims.

The invention claimed is:

1. A method comprising:
    displaying content on a first device;
    receiving, at the first device, user input to transfer the content from the first device to a second device over a network;
    in response to the user input, automatically transferring the content that is displayed on the first device to the second device to cause the second device to display the transferred content;
    receiving, at the first device, additional user input to control the transferred content displayed at the second device; and
    transmitting instructions from the first device to the second device to control the transferred content displayed at the second device based on the additional user input.

2. The method of claim 1, wherein the additional user input causes the content displayed at the first device to be updated.

3. The method of claim 2, wherein the instructions transmitted to the second device cause the transferred content to be updated.

4. The method of claim 3, wherein the transferred content is displayed at the second device concurrently with the display of the updated content at the first device.

5. The method of claim 1, wherein the instructions transmitted to the second device cause the transferred content to be removed from the second device.

6. The method of claim 1, wherein the content is dynamic content.

7. The method of claim 1, wherein the user input comprises a gesture.

8. The method of claim 1, further comprising pairing the first device with the second device via the network.

9. The method of claim 1, wherein the first device is a mobile device, and wherein the second device is a television.

10. The method of claim 1, wherein the first device is a first mobile device, and wherein the second device is a second mobile device.

11. A device comprising:
a display device to display content;
at least a memory and a processor to perform operations comprising:
receiving user input to transfer the content to an additional device over a network;
in response to the user input, transferring the content to the additional device to cause the additional device to display the transferred content; and
controlling the transferred content at the additional device based on additional user input received at the device.

12. The device of claim 11, wherein the controlling further comprises transmitting instructions to the additional device to control the transferred content displayed at the additional device based on the additional user input.

13. The device of claim 12, wherein the additional user input causes the content displayed at the device to be updated.

14. The device of claim 13, wherein the instructions transmitted to the additional device cause the transferred content to be updated.

15. The device of claim 14, wherein the instructions transmitted to the additional device cause the transferred content to be removed from the additional device.

16. The device of claim 15, wherein the transferred content is displayed at the additional device concurrently with the display of the updated content at the device.

17. The device of claim 11, wherein the user input comprises a gesture.

18. The device of claim 11, wherein the operations further comprise pairing the device with the additional device via the network.

19. The device of claim 11, wherein the device is a mobile device, and wherein the additional device is a television.

20. A device comprising:
a display device;
at least a memory and a processor to perform operations comprising:
receiving, over a network from an additional device, content displayed at the additional device;
displaying, on the display device, the content displayed at the additional device;
receiving, over the network from the additional device, instructions to control the content displayed at the additional device; and
controlling the content displayed on the display device based on the instructions received from the additional device.

\* \* \* \* \*